Sept. 29, 1970     B. L. GOODMAN ET AL     3,531,404
SEWAGE TREATMENT SYSTEM
Filed April 1, 1968     2 Sheets-Sheet 1
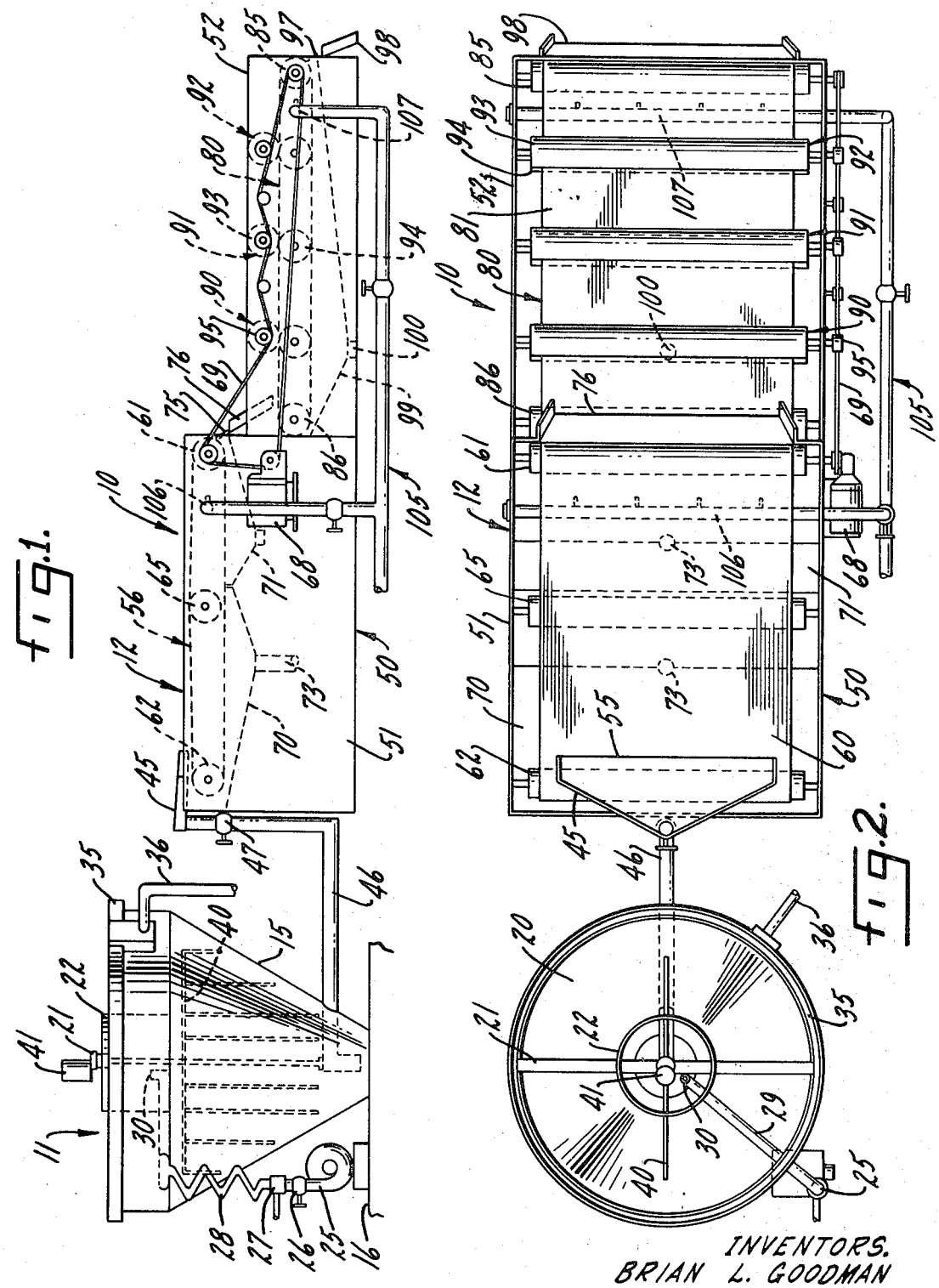
INVENTORS.
BRIAN L. GOODMAN
ROBERT M. APPLEBERRY
JOHN W. STRUEWING
FRANK G. WEIS
BY Hume, Clement, Hume & Lee
Attorneys.

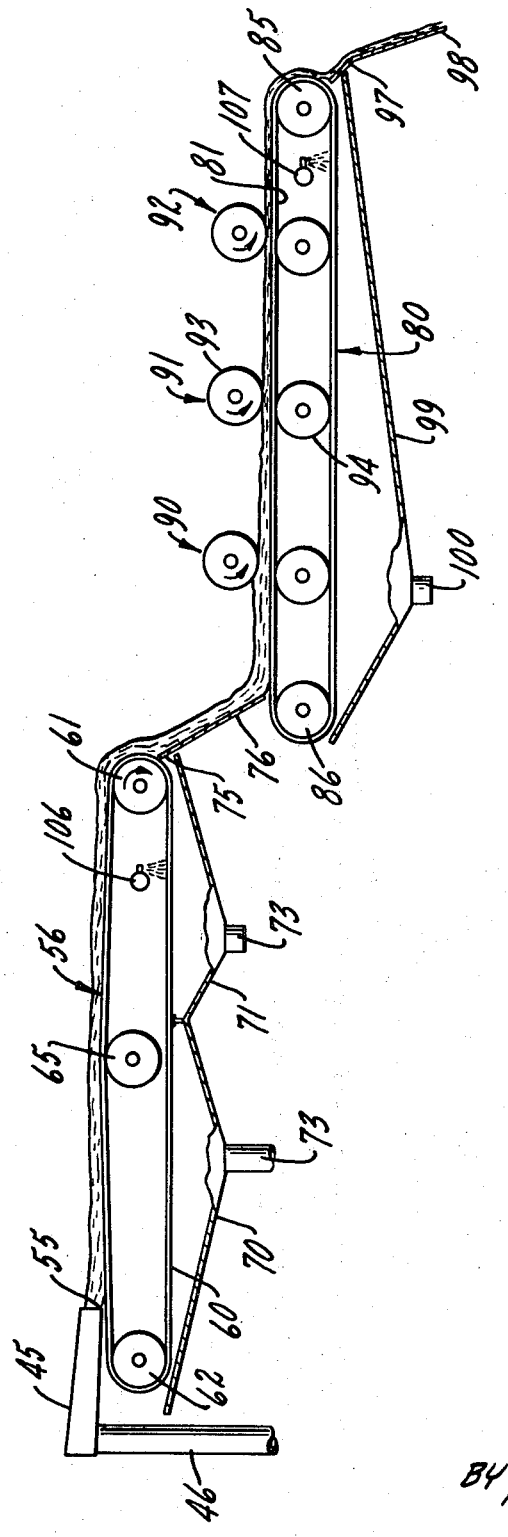

United States Patent Office 3,531,404
Patented Sept. 29, 1970

3,531,404
SEWAGE TREATMENT SYSTEM
Brian L. Goodman, Overland Park, Kans., Robert M. Appleberry, Independence, Mo., John W. Struewing, Overland Park, Kans., and Frank G. Weis, Kansas City, Mo., assignors, by mesne assignments, to Union Tank Car Company, a corporation of Delaware
Filed Apr. 1, 1968, Ser. No. 717,507
Int. Cl. B01d 33/04; C02c 3/00
U.S. Cl. 210—54    8 Claims

ABSTRACT OF THE DISCLOSURE

A process and apparatus for de-watering sewage sludge or the like. The sludge is first flocculated with a coagulent and then gravity fed onto a primary, large mesh, moving screen, which is flexed intermediate its ends. Water drains from the sludge through the screen, its flow enhanced by flexing of the sludge cake which is forming. Partially de-watered sludge is then scraped onto a secondary large mesh, moving screen, which carries the sludge between a series of pairs of compression rollers, providing successively greater compression to further de-water the sludge.

BACKGROUND OF THE INVENTION

This invention relates in general to the treatment of sewage. It deals more particularly with the concentration, for disposal, of sludges which are the product of sewage aeration, sedimentation, chemical precipitation, or industrial waste treatment, as well as other processes.

The present system, which is, for purposes of illustration only, discussed in terms of the treatment of sewage sludge created by aeration, utilizes the generally known technique of gravity filtration of sludge on monofilament screens. The low pressure developed in gravity filtration tends to prevent the screens from blinding because it does not force the suspended particles into screen openings. There are several systems in use today employing one form or another of this low pressure, gravity filter technique. They include the Roto-Plug system, the Heymann sludge thickening process, and the Dual-Cell Gravity Filter system, the latter being illustrated in the Smith Pat. No. 3,117,927.

The Roto-Plug concentrator consists of a thickening cell and a compression cell. The thickening cell is a cylinder made up of a fine mesh monofilament screen attached to two annular rims, and resembles a rotary drum mixer. The sludge is introduced to one open end of this cell, which rotates slowly at approximately two r.p.m. Water drains through the screen and the thickening sludge is retained on the screen. As the screen rotates, the sludge continually slides and rolls down to the lowermost part of the drum until an accumulation develops which forms a rolling plug of thick sludge.

The tendency of solids to stick together causes the plug to grow larger. As it grows, its own weight forces additional water out of the screen and does not blind the screen because of the cleaning action of the plug. The plug eventually grows until it overflows the rims of the cell and slides down chutes to the compression cell. Here the thickened sludge is compressed between a drum and hard rubber rollers.

The main disadvantage of the Roto-Plug system is the low solids recovery rate due to the loss of solids in the compression cell. In practice, for example, it has been found that only approximately sixty to sixty-five percent removal of the solids is achieved. Although these figures are from tests where the use of polyelectrolytes or other chemical conditions were not indicated, the figures should be quite representative since the sludges treated were raw primary sludges which, in general, tend to floc more readily and are easier to filter.

The Dual-Cell Gravity (DCG) filter system comprises a moving belt device in which two cells are formed by passing the belt around to two sets of wheels and over a drive sprocket and a roller located between the wheel sets. The belt is made of a fine mesh, monofilament nylon screen. In operation, conditioned sludge is added to the center of the de-watering cell and allowed to drain. As the belt moves across a drive roller, it carries sludge into the cake-forming cell where the plug is formed in the same manners as in the Roto-Plug system. The main disadvantage of the DCG system is its low flow rate, i.e., 5 to 10 gallons per minute, depending upon the type of sludge de-watered. Accordingly, it is relatively expensive to operate.

The Heymann sludge thickening process utilizes a vibrating screen in the initial de-watering process, followed by a rotary filter press, similar to the compression section of the Roto-Plug system. The efficiency of this type of system, like the Roto-Plug system, is also relatively low.

SUMMARY OF THE INVENTION

The present invention is embodied in a greatly improved gravity filtration process and apparatus for concentrating and de-watering sewage treatment sludges, or the like. A primary object of the apparatus and process is to de-water sludges and other materials wherein the solids concentration in the de-watered sludge is increased to about fifteen percent or more, thus reducing the sludge bulk by approximately ninety-five percent or more. Accordingly, the concentrated solids can be handled more easily.

The foregoing and other objects are realized in accord with the present invention by providing an apparatus and process for de-watering sewage sludges and the like wherein the sludge is flocculated with a suitable coagulent. The flocculated sludge flows by gravity from onto a primary screen where sludge is retained and water drains through the screen.

The screen is made up in the form of a belt-type conveyor which is supported, generally at its mid-point, by a middle roller. The middle roller is suitably mounted to flex the screen upwardly. This flexing causes additional de-watering of the flocculated sludge product by stretching the sludge cake and enhancing drainability.

The primary screen belt deposits this sludge onto a secondary screen through scraping action which releases more water from the sludge mass. The sludge is carried, on the secondary screen, which is also in the form of a belt-type conveyor, through a series of pairs of compression rollers where it is subjected to increasing compression as it passes each successive pair of rollers, thus squeezing out additional water.

The screens are, in practice, made of monofilament material having a relatively large mesh opening. Characteristically, such a screen is only as thick or deep as the filaments themselves and, accordingly, the drain-through flow path is extremely short. The effect is to pass large volumes of water while retaining virtually all solids.

BRIEF DESCRIPTION OF THE DRAWINGS

The invention, including its construction and method of operation, along with other objects and advantages thereof, is illustrated more or less diagrammatically in the drawings, in which:

FIG. 1 is a diagrammatic side elevational view, with parts broken away and with parts in section, of a sludge concentrator system embodying features of the present invention;

FIG. 2 is a diagrammatic plan view of the system illustrated in FIG. 1; and

FIG. 3 is an enlarged side elevational view, diagrammatically illustrated, of the de-watering assembly in the sludge concentrator system.

DESCRIPTION OF THE PREFERRED EMBODIMENT

Referring now to the drawings, and particularly to FIGS. 1 and 2, a sludge concentrator system embodying features of the present invention is illustrated generally at 10. The system 10 comprises a pre-mix settling tank assembly 11 and a sludge de-watering assembly 12. Sludge is flocculated by a suitable coagulent in the pre-mix settling tank 11, gravity fed to the de-watering assembly 12, and de-watered, all according to the process of the invention.

The pre-mix settling tank assembly 11 comprises a large, generally frusto-conical tank 15, suitably mounted on a support structure 16. The tank 15 defines, within its confines, a settling chamber 20. Suspended from a supporting cross-beam 21 mounted across the top of the tank 15 is a right cylindrical stilling well 22.

Sludge is, in the present illustration, introduced to the tank 15 from a suitable source (not shown), by pumping it through a sludge inlet pipe 25. It might, however, be introduced by gravity flow or other means. The sludge passes through a conventional metering valve 26 at the head of the pipe 25 to a coagulant inlet T 27. At the T 27, a coagulant is introduced to the sludge. In practice, Rohm & Haas' Primafloc C–7 is employed because its produces agglomerates of substantial clump size and strength. The Hercules Power Company's 210 and 220 series polyelectrolytes are also ideally suited. However, other coagulants, either organic or inorganic, and combinations of these, including alum, ferrous sulphate, ferric chloride and lime, etc., might be advantageously employed.

The sludge-polyelectrolyte mixture passes upwardly through the undulating mixing pipe 28 to a transversely extending inlet pipe 29. The inlet pipe 29 introduces the mixture upwardly into the open lower end of the stilling well 22, as at 30, where additional mixing takes place due to the velocity of the incoming mixture.

The sludge is flocculated by the electrolyte and the floc passes at relatively low velocity out of the open bottom of the stilling well 22 into the settling chamber 20. This flocculated sludge settles downwardly while clear supernatant liquid overflows the edge of the tank 15 into a collecting trough 35, from which it is discharged to a suitable drain (not shown) through the effluent pipe 36.

The flocculated sludge settles in the frusto-conical settling chamber 20 and concentrates in the bottom of the tank 15. The sludge is further concentrated by a mixer unit 40 in the chamber 20, whose arms 40a are rotated in the settling sludge at a peripheral speed of approximately two to three feet per minute with an electric gear drive device 41 mounted on the cross beam 21 over the stilling well 22.

The concentrated, flocculated sludge flows by gravity from the settling chamber onto a dispensing pan 45 in the sludge de-watering assembly 12 through a relatively large diameter pipe 46. The flow rate of the sludge through the pipe 46 is controlled by a conventional metering valve 47. Gravity flow of the flocculated sludge is employed, according to the invention, to prevent re-dispersement of the relatively fragile flocculated sludge in the slurry which is treated by the sludge de-watering assembly 12. In addition the low head pressure of the gravity flow makes the slurry considerably easier to meter onto the dispensing pan 45.

The sludge de-watering assembly 12 includes an elongated frame 50 comprising an inlet frame section 51 and an outlet frame section 52. The frame 50 is constructed in a conventional manner from suitable structural members. Since it forms no specific part of the present invention, however, it is illustrated in diagrammatic form in the drawings and not described in any detail.

The dispensing pan 45 is mounted in a conventional manner on the top of the inlet frame section 51, adjacent one end thereof. As illustrated in FIG. 2, the dispensing pan 45 is generally triangular in plan and its elongated discharge edge 55 overlies one end of a primary screen conveyor 56, mounted in the frame section 51. The angle of the pan 45 to the screen conveyor 56 is adjustable to control the rate of slurry flow onto the screen conveyor.

The primary screen conveyor 56 includes an endless belt screen 60 made of a synthetic fabric, such as Nitex, imported by Tobler, Ernst and Traber of New York, N.Y. Nitex is a Swiss made, monofilament, large mesh fabric having relatively large openings. In the present invention, a fabric having openings from 250 to 1,410 microns must be employed. The belt screen 60 extends around a drive roller 61 suitably journaled in the frame section 51 opposite the dispensing pan 45, and a driven roller 62, also suitably journaled in the frame section 51 and underlying the dispensing pan. Intermediate the rollers 61 and 62, a flexing roller 65 is journaled in the frame section 51. The flexing roller 65 raises the screen 60 slightly above a plane extending between the rollers 61 and 62 and, accordingly, flexes the screen 60 as it passes over the roller, for reasons hereinafter discussed. The conveyor 56 is driven by a conventional drive motor unit 68, suitably mounted on the frame section 51, through a drive belt 69.

As the motor 68 drives the conveyor 56, flocculated sludge drains from the dispensing pan 45 onto the screen 60 where the sludge is retained and water drains through the screen. Since the screen 60 is continuously moving, the surface upon which the sludge is deposited from the dispensing pan 45 is always relatively clear. The angle of the pan 45 is adjusted to assure this relationship. By the use of a large mesh, monofilament fabric, the water drains through the screen 60 at a high flow rate of from 1 to 100 gallons per square foot of exposed filter media per minute, depending upon the type of sludge as affecting drainability.

It is important that the suspended solids be brought together in sufficiently large clumps to span the openings in the screen 60. The strength of agglomeration must be sufficient to withstand mechanical stresses to which the flowing slurry is subjected. This combination of clump size and agglomeration strength is achieved with the aforementioned polyelectrolytes, for example.

The slurry must be carefully laid on the screen 60 in a thin film so that mechanical stresses do not break up the agglomerates, causing them to pass through the screen. The thin film is necessary to let water drain properly. The screen mesh opening should be in the range hereinbefore described since larger openings permit the agglomerates to pass through because of insufficient strength to bridge the openings while smaller openings cause rapid blinding. In the mesh range of 250 to 1410 microns, the agglomerate developed is strong enough to bridge the mesh openings but the openings are large enough so that the agglomerate does not completely cover them.

The eccentric roller 65 intermediate the ends of the screen 60 causes the screen to be flexed upwardly, as has been pointed out. This flexing of the screen 60 has been found to enhance the passage of water through the screen and, by stretching and cracking the sludge cake, accordingly, increase the flow rate. Water lying on top of the cake can pass through the cracks. The already high efficiency of the system 10 is further enhanced.

The water or primary filtrate which passes through the screen 60 is collected in collecting troughs 70 and 71 suitably mounted in the frame section 51. The collecting troughs 70 and 71 underlie the screen 60, as best illustrated in FIG. 3. Each trough 70 and 71 has an outlet pipe 73 in its base. The outlet pipes 73 are normally connected to a suitable drain (not shown).

As the water drains through the screen 60, the screen moves around the drive roller 61 and past a scraper bar 75 suitably arranged adjacent the screen 60. The scraper bar 75 is supported by a transition pan 76 which is, in turn, mounted in a conventional manner on the corresponding end of the frame section 52. The scraper bar 75 removes partly de-watered sludge from the surface of the screen 60 and this sludge slides down the pan 76 onto the inlet end of a secondary screen conveyor 80. The scraping action breaks the sludge and releases more water from the sludge mass. This water drains through the endless belt screen 81 of the conveyor 80. It should also be pointed out here that the angle of the pan 76 can be adjusted. This controls flow rate of the sludge. Collaterally, it controls an additional de-watering influence by causing sludge to "pile-up" slightly, whereby compression effects such additional de-watering. The screen 81 is also made of a monofilament synthetic fabric such as Nitex having mesh openings in a range from 250 to 1410 microns, whereby water drains off rapidly.

The screen 81 extends around a drive roller 85 and a driven roller 86 suitably journaled in the frame section 52 adjacent opposite ends thereof. Also journaled in the frame section 52, intermediate the drive and driven rollers 85 and 86, are three sets 90, 91 and 92 of compression rollers. Each set 90–92 of compression rollers includes a drive roller 93 disposed above the upper reach of the belt screen 81 and a driven roller below the upper reach of the belt screen.

Each drive roller 93 is driven by the drive belt 69, as best illustrated in FIG. 2. The tension rollers 95 journaled in the frame section 52 tension the belt against the driver rollers 93. The belt 69 extends around the drive roller 85 of the conveyor 80 and returns to the drive motor unit 68.

Each set 90, 91 and 92 of compression rollers is adjustably mounted in the frame section 52 so as to provide progressively greater compression on the sludge being carried along the upper reach of the screen 81 toward the drive roller 85. The sludge is carried between these sets 90–92 of compression rollers and subjected to increasing compression with each set squeezing out additional water.

The sludge must be compressed to squeeze out a larger percentage of bound and trapped water. This cannot be accomplished if the aforedescribed steps of the process are not performed properly. If insufficient water has drained from the sludge, there will not be sufficient cohesiveness and the rollers will either squeeze it through the screen 81 or it will be squeezed away from the rollers and will not pass between them.

It is interesting to note here that as sludge of the type involved is dried by compression, its structure changes to permit greater compression. Thus, more pairs of compression rollers produce even greater drying. Up to six pairs might well be used, although three have been found suitable for most conditions. Beyond six pairs, little de-watering is effected.

As the relatively dry sludge passes over the drive roller 85 on the screen 81, a scraper 97 mounted on the frame section 52 removes the sludge from the surface of the conveyor belt 81. The de-watered sludge slides down a pan 98 into a receptacle (not shown) for disposal in an acceptable manner.

As this water or secondary filtrate drains from the sludge through the screen 81 of the conveyor 80, it is collected in a collecting trough 99 suitably mounted in the frame section 52 under the conveyor. This water drains from the trough 99 through an outlet pipe 100, normally to the aforementioned drain (not shown).

The sludge de-watering assembly 12 is equipped with a water spray system 105 to clean the screens 60 and 81 and prevent screen blinding. A primary screen spray head 106 mounted between reaches of the screen 60 is operated continuously at a flow rate of five to six gallons per minute while a secondary screen spray head 107 mounted between reaches of the screen 81 is operated intermittently, as required, at the same flow rate. This water serves to open up blinded portions of the screens, and it is ultimately collected below the screen in corresponding collecting troughs 70, 71 and 99.

A new and more efficient process and apparatus for concentrating and de-watering sewage treatment process sludge has now been illustrated and described. By using a large mesh filter medium, separated water is allowed to drain off more rapidly, thus permitting a higher flow rate and more rapid treatment. The low head pressure afforded by gravity flow facilitates the use of a large mesh filter medium. By use of coagulating mediums, well digested and low fiber content sludges can be concentrated sufficiently to work effectively with a large mesh screen. In this light, the preferred polyelectrolytes have common characteristics in their cationic nature and very high average molecular weight.

The simple and flexible system of the invention is adaptable to the de-watering of a wide range of sludges which might be treated. With some sludges, for example, only the simple admixture of a coagulent prior to gravity feeding the mixture onto a large mesh screen is required. Adequate flocculation and concentration of the sludge is achieved without the use of a pre-mix and settling tank.

Similarly, under certain conditions sufficient de-watering of the sludge can be achieved utilizing only the primary screen section of the sludge concentrator system. If, for example, the de-watered sludge is to be disposed of in the immediate area and transportation of the greater bulk of a somewhat less de-watered sludge is not a factor, the secondary screen section with its compression function can be eliminated.

The invention also contemplates that sludge can be de-watered to the extent that its solid content is increased up to approximately twenty-five percent, for example. Such sludge is sufficiently dried to be disposed of by burning. If such de-watering is desirable, up to six pairs of compression rollers can be utilized with the secondary screen section of the system.

It should now be recognized that the simple and flexible system of the invention permits its use on various sludges with minimum adjustment. The system is sectionalized so that its components can be used in various combinations. A unit can be produced at low cost and is modular so that it can be expanded in capacity if need arises by simply installing additional units.

It should also be pointed out that the term monofilament as used in this application to describe the screen material is intended to be inclusive of woven materials wherein the strands which are woven to form the relatively large opening mesh are, in their own right, actually formed of multiple fibres or the like. Thus, "monofilament" in the glossary of this application means "single strand."

While the embodiment described herein is at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A process for concentrating and de-watering sludge, comprising the steps of:
   (a) providing horizontally disposed moving, monofilament screen means,
   (b) mixing waste treatment sludge with a flocculant,
   (c) feeding flocculated sludge in a water carrier onto said screen means by floating the sludge substantially horizontally off feed means onto said screen means,
   (d) carrying the sludge horizontally on said screen means while water drains through the screen means,
   (e) passing said screen means carrying sludge through compression means which exert progressively increasing pressure on the sludge as it passes through said compression means, and (f) removing the de-watered sludge from said screen means.

2. The process of claim 1 further characterized by and including the step of:

(a) mixing the waste treatment sludge with a polyelectrolyte flocculant which has a high molecular weight and is cationic.

3. The process of claim 1 further characterized by and including the step of:

(a) flexing said screen means upwardly substantially across its entire width to stretch and crack the sludge cake which forms on the screen means so that the drainage of water through said sludge cake is increased.

4. A process for concentrating and de-watering sludge, comprising the steps of:

(a) providing a horizontally disposed, continuously moving monofilament primary screen,
(b) mixing waste treatment sludge with a flocculant,
(c) feeding flocculated sludge in water onto said primary screen by floating it substantially horizontally off feed means onto said primary screen,
(d) carrying the sludge horizontally on said primary screen while water drains through the primary screen,
(e) scraping partially de-watered sludge from primary screen and depositing it on a continuously moving secondary screen,
(f) passing the secondary screen carrying said partially de-watered sludge through a series of compression roller means, including upper roller means coming into direct contact with the sludge which bring progressively greater pressure to bear on said sludge, and
(g) removing the de-watered and compressed sludge from said secondary screen.

5. The process of claim 4 further characterized by and including the step of:

(a) flexing said primary screen across its entire width to stretch and crack the sludge cake which forms and enhance the passage of water through said sludge cake.

6. An apparatus for de-watering sludge in a treatment system, comprising:

(a) continuously moving, horizontally disposed screen means,
(b) said screen means being formed of a monofilament, woven material having large mesh openings in the range of 250–1,410 microns,
(c) substantially horizontal means for feeding flocculated sludge slurry onto said screen means by floating it substantially horizontally off of said feed means onto the screen means,
(d) a series of compression roller means between which a portion of said screen means runs,
(e) said roller means arranged to effect progressively greater compression of the sludge on the screen means as it passes between said roller means, and
(f) means for removing de-watered sludge cake from the screen means.

7. The apparatus of claim 6 further characterized in that:

(a) said screen means comprises a primary screen and a secondary screen,
(b) transition pan means for removing partially de-watered sludge cake from said primary screen and depositing it on said secondary screen,
(c) said transition pan means compressing partially de-watered sludge transversely of said screens to cause additional water to flow from said sludge cake, and
(d) compression means applying de-watering pressure to said sludge cake on said secondary screen.

8. The apparatus of claim 6 further characterized by and including:

(a) flexing roller means underlying said screen means to flex it across its entire width as said screen means moves over said flexing roller means whereby the sludge cake on said screen means is flexed and cracked to permit water to flow through it at a greater rate.

References Cited

UNITED STATES PATENTS

| | | | |
|---|---|---|---|
| 1,958,279 | 5/1934 | Morgan | 210—400 X |
| 2,021,122 | 11/1935 | Fowler | 210—152 X |
| 2,097,529 | 11/1937 | Nordell | 210—401 X |
| 2,798,609 | 7/1957 | Smith et al. | 210—66 |
| 2,848,113 | 8/1958 | Paterson et al. | 210—400 X |
| 3,053,392 | 9/1962 | Morrison | 210—401 X |
| 3,117,927 | 1/1964 | Smith | 210—326 |
| 3,200,949 | 8/1965 | Aulich et al. | 210—400 X |
| 3,259,570 | 7/1966 | Priesing et al. | 210—10 X |

FOREIGN PATENTS

| | | |
|---|---|---|
| 222,221 | 9/1924 | Great Britain. |

MICHAEL E. ROGERS, Primary Examiner

U.S. Cl. X.R.

210—10, 66, 400